United States Patent [19]

Morelli

[11] Patent Number: 4,814,932
[45] Date of Patent: Mar. 21, 1989

[54] DEVICE FOR PROTECTION AGAINST SHORT CIRCUITS FOR AC NETWORKS AND CURRENT LIMITING CIRCUIT BREAKER APPROPRIATE FOR SUCH A DEVICE

[75] Inventor: Albert Morelli, Le Peco, France
[73] Assignee: La Telemecanique Electrique, France
[21] Appl. No.: 169,197
[22] Filed: Mar. 3, 1988
[30] Foreign Application Priority Data Jul. 3, 1986 [FR] France ............... 86 09659
Jul. 1, 1987 [WO] PCT Int'l Appl....PCT/FR87/00255

[51] Int. Cl.⁴ .................................... H02H 3/08
[52] U.S. Cl. .................................... 361/63; 361/93
[58] Field of Search ............... 361/62, 63, 64, 93

[56] References Cited

U.S. PATENT DOCUMENTS

| | | | |
|---|---|---|---|
| 3,805,113 | 4/1974 | Friedrich | 361/64 |
| 4,354,215 | 10/1982 | van der Scheer | 361/63 |
| 4,442,471 | 4/1984 | Trayer | 361/63 |
| 4,607,309 | 8/1986 | Bishop | 361/63 X |
| 4,724,502 | 2/1988 | Kawahira et al. | 361/62 |

FOREIGN PATENT DOCUMENTS 2418974 9/1979 France .
2515867 6/1983 France .

Primary Examiner—A. D. Pellinen
Assistant Examiner—Derek S. Jennings
Attorney, Agent, or Firm—William A. Drucker

[57] ABSTRACT

A device for protecting an AC distribution network against short circuit currents and an appropriate current limiting circuit breaker. A downstream circuit breaker (D1) generates a signal (S) for neutralizing the opening of the contacts of an upstream current limiting circuit breaker (D2) when the downstream current exceeds a neutralization threshold less than the tripping threshold and/or than the limitation threshold of (D2). The upstream current limiting circuit breaker (D2) has in parallel a pair of head to tail thyristors (TH1, TH2) and a circuit (16) for controlling the gates of the thyristors, this circuit enabling one of the thyristors in response to the signal (S) for inhibiting (D2) for at most one half wave.

6 Claims, 2 Drawing Sheets

DEVICE FOR PROTECTION AGAINST SHORT CIRCUITS FOR AC NETWORKS AND CURRENT LIMITING CIRCUIT BREAKER APPROPRIATE FOR SUCH A DEVICE

The present invention relates to a device for protecting an AC distribution network against short circuit currents, as well as a current limiting circuit breaker appropriate for such a device.

To provide such a protection, it has been known for several years to use circuit breakers of the current limiting type. Compact and light, these circuit breakers are capable of providing ultrarapid breaking of currents presumed very high, for example from 50 to 100 kA, by limiting the peak current to a value from 15 to 30 kA for example. The electrodynamic forces in the sets of bars are thus reduced to values about 10 times smaller than those met with in circuit breakers without current limiting and the energies brought into play are about 30 to 100 times smaller.

The current limiting circuit breakers have separable contacts and a magnetic trip capable of opening these contacts through a lock when the current reaches a tripping threshold; the separable contacts—or other separable contacts in series therewith—are able to be opened very rapidly by electrodynamic repulsion when the current which flows therethrough reaches a repulsion threshold generally slightly greater than the tripping threshold.

Therefore, the current limiting circuit breakers generally have the drawback of lacking in selectivity and, if such apparatus are used distributed over several levels in a distribution system, it can be observed that the operation of the system is not satisfactory. In fact, as soon as the current in a downstream current limiting circuit breaker reaches the limitation threshold, the electrodynamic repulsion contacts of the circuit breaker open. Since the current continues to increase for 1.5 to 2 ms before regressing there is a risk of exceeding the limmitation threshold of the upstream associated current limiting circuit breaker and it may be feared that it also trips with consequently cutting off of all the downstream branches which it feeds. The result is that it would be desirable, for ensuring continuity of service, to have so called selective circuit breakers at the upstream levels letting the current peak pass rather than current limiting circuit breakers.

The absence of current limiting circuit breakers at the immediately upstream level—and a fortiori at the other upstream levels—cause higher short circuit currents and considerable electrodynamic forces, which requires using for the distribution system heavy and expensive circuit breakers and very rigid and therefore costly sets of bars.

The purpose of the invention is especially to obviate these drawbacks by providing a protection device which includes current limiting circuit breakers on at least two successive levels of the distribution system and which nevertheless presents the desired selectivity.

Another aim is to obtain such selectivity by means of simple electronic means and finally aims at privileging safety in the case of a fault affecting the correct operation of said means.

The invention relates to a device for protecting an AC distribution network against short circuit currents, the network including at least one upstream current limiting circuit breaker and at least one downstream current limiting circuit breaker placed in series in an upstream branch and respectively at least one dependent downstream branch of the network and each including a main power circuit having separable contacts, a magnetic tripping means capable of opening said contacts when a current reaches a tripping threshold and a limiter capable of opening said contacts—or other contacts in series therewith—when the current reaches a limitation threshold.

In accordance with the invention, the downstream branch is provided with a current sensor connected to a processing circuit which generates a neutralization signal for the upstream current limiting circuit breaker when the current in the downstream branch exceeds a given neutralization threshold less than the tripping threshold and/or than the repulsion threshold of the upstream current limiting circuit breaker; a pair of head to tail thyristors is disposed in parallel with the main power circuit of the upstream current limiting circuit breaker; a circuit for controlling the gates of the thyristors is adapted and controlled by the neutralization signal coming from the downstream current limiting circuit breaker so as to enable the thyristors and inhibit the main power circuit of the upstream current limiting circuit breaker for a time at least equal to a half wave.

Thus, using very simple electronic neutralization means, it is possible to conciliate the desired selectivity with the use of current limiting circuit breakers.

The following description of one non limitative embodiment will help explain other features and advantages of the invention.

Figure 1:
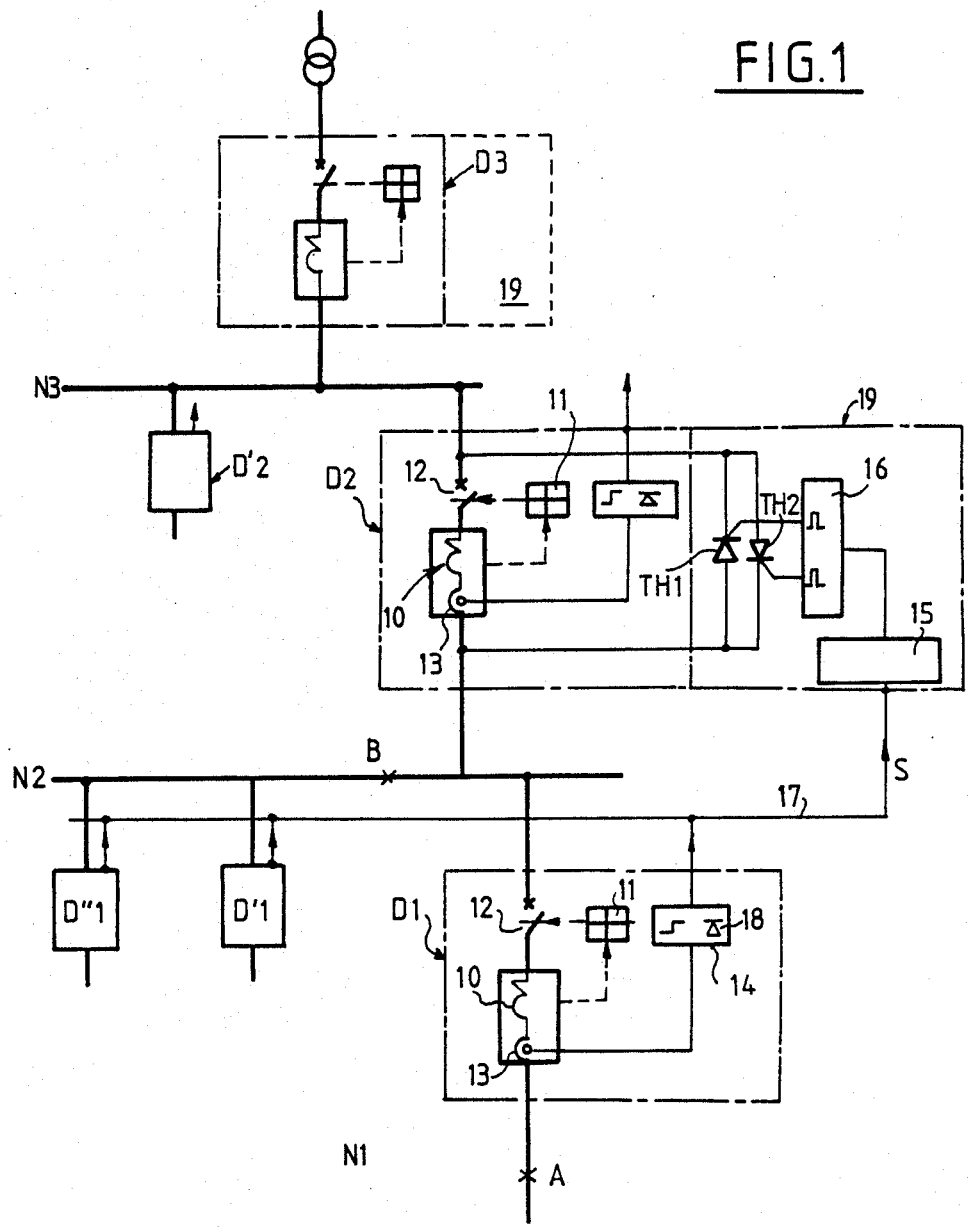
FIG. 1 is a diagram of the protection device of the invention.

The protection device shown in FIG. 1 is for protecting an AC distribution network against short circuit currents. The network has several successive distribution levels, namely for example terminal levels N1, secondary levels N2 and a general level N3.

Between the levels N1 and N2 are disposed current limiting circuit breakers D1, D'1, etc.; between N2 and N3 current limiting circuit breakers D2, D'2 etc.; upstream of N3 a circuit breaker which may possibly be current limiting D3. The current limiting circuit breakers in question may be manually, electrically, pneumatically controlled etc.

Each current limting circuit breaker has a main power circuit with a magnetothermal tripping means 10 acting through a lock 11 on separable contacts 12. The main power circuit has a current limiting member not shown, integrated or juxtaposed with the circuit breaker properly speaking and including separable contacts with electrodynamic repulsion or percussion merging with contact 12 or in series therewith.

In each branch including a current limiting circuit breaker D1, D'1, . . . ; and dependant on the upstream branch of the network in which the current limiting circuit breaker D2 is disposed, a current sensor 13 is provided whose output is connected to a threshold signal processing circuit 14 capable of delivering a neutralization signal S. Sensor 13 may advantageously form part of the magnetic tripping means. The threshold processing circuit may be integrated in the upstream current limiting circuit breaker D2 or in an additive block associated therewith. In the present case, the threshold processing circuits 14 are associated with current limiting circuit breakers D1, D'1, ... and serve as output circuits therefor, while themselves being connected to the upstream current limiting circuit breaker D2, more precisely to an input circuit 15 associated with this latter. The input circuit 15 is connected to a circuit 16 for controlling the gates of thyristors TH1, TH2 mounted head to tail in parallel with the main power circuit of the upstream current limiting circuit breaker D2. Depending on the case and particularly depending on the mode of transmission adopted—monoconductor bus or multiconductor connection—the threshold processing circuit 14 of D1, D'1, . or the input circuit 15 of D2 has a logic element providing the logic OR combination. In the simplest case, this logic element is a diode 18 for neutralizing D2 from any one of the dependent current limiting circuit breakers D1, D'1, . . . .

Figure 2:
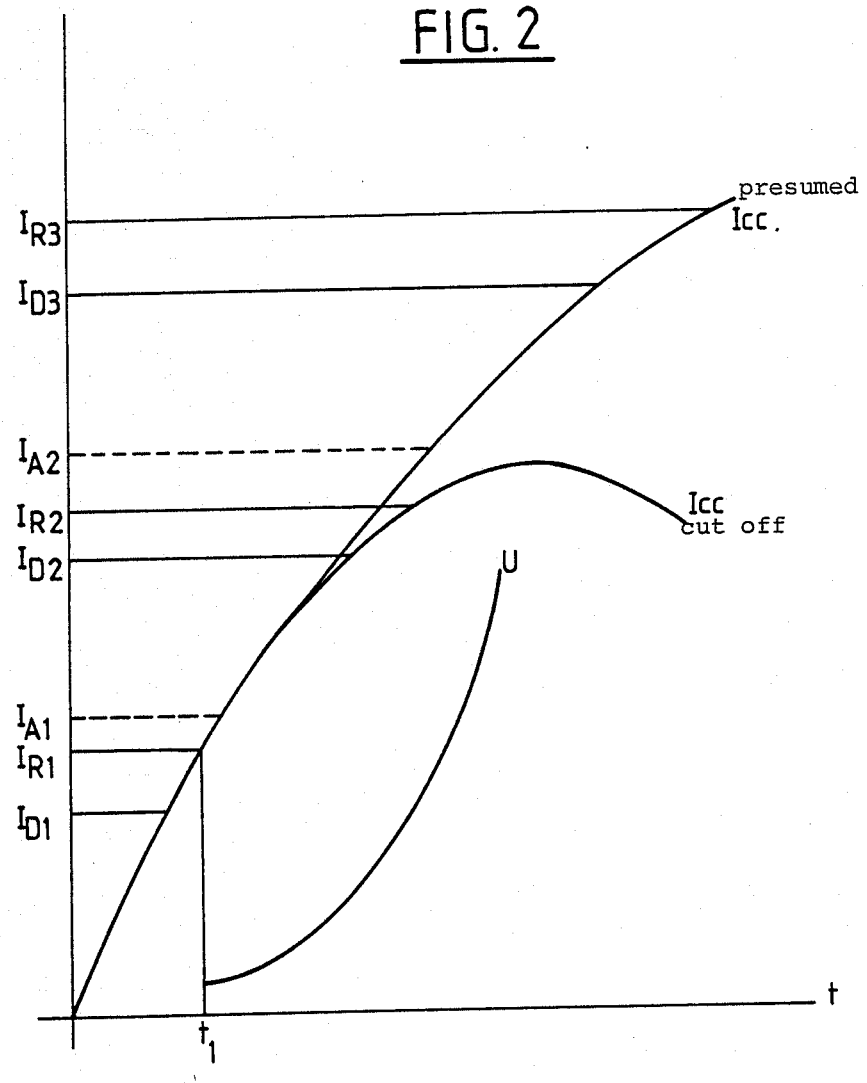
FIG. 2 shows the evolution of a short circuit current and of the corresponding arc voltage of the downstream current limiting circuit breaker in the device of FIG. 1.

The operation of the device of the invention will now be expalined with reference to FIG. 2.

When a short circuit current Icc occurs likely to develop along the "presumed Icc" curve in the terminal circuit protected by D1, the current limiter of D1 opens the corresponding branch at time $t_1$ then the magneto-thermal trip of D1 confirms its opening; thus an arc voltage $U_{ARC}$ develops at the terminals of D1.

The values $I_{A1}$, $I_{D1}$ and $I_{R1}$ designate respectively for the current limiting circuit breaker D1 the current thresholds for neutralizing the threshold processing circuit 14, for tripping lock 11 and for the limitation or electrodynamic repulsion of the current limiting member. The values $I_{A2}$, $I_{D2}$, $I_{R2}$ and $I_{A3}$, $I_{D3}$, $I_{R3}$ designate homologous thresholds for the current limiting circuit D2 and D3. The device can only operate if $I_{A1} < I_{D2}$ or $I_{R2}$ and $I_{A2} < I_{D3}$ or $I_{R3}$. $I_{A1}$ may for example be equal to $ID_1$.

In the case of a short circuit at point A in the terminal circuit protected by D1, as soon as the current reaches the neutralization threshold $I_{A1}$ of the processing circuit 14 of D1, this latter delivers a neutralization signal S in response to which the circuit 16 of D2 generates a firing signal preferably of the order of a few milliseconds for the gates of thyristors TH1, and TH2. The firing may be made possible a few microseconds after overshooting the threshold $I_{A1}$. Before the current crosses the limitation threshold $I_{R2}$, the lowering of pressure of contacts 12 causes an increase in the anode-cathode voltage of the thyristors. When this voltage reaches for example 10 V or so, firing of one of the thyristors is effective. That one of the two thyristors which has been enabled shunts the contacts of the main power circuit of the upstream current limiting circuit breaker D2 just before the current passes through the limitation threshold $I_{R2}$; thus, the current is transferred into the thyristor while preventing the tripping of the current limiting member and the lock of D2. The current limiting circuit breaker D2 therefore continues by means of the head to tail thyristors to feed the downstream branches carrying D'1, etc. which determines the continuity of service desired.

With the tripping threshold $I_{D1}$ then the limitation threshold $I_{R1}$ exceeded in the current limiting circuit breaker D1, this latter cuts off the corresponding branch while developing an arc voltage, so that reduction of dIcc/dt then of Icc can be observed.

The enabled thyristor remains enabled until the short circuit current passes again through a zero, that is to say conducts for at most a current half wave. The contacts of the upstream current limiting circuit breaker D2 then begin again to convey the whole of the current of the upstream branch. It should be noted that the short conduction time of the thyristors involves a low heat dissipation thereof and so the absence of heat sinks. Furthermore, the thyristors do not cut off the short circuit current, since they operate for shunting and de-shunting the main power circuit of the current limiting circuit breaker. They therefore do not undergo high dv/dt at cut off.

In the case of a short circuit at point B of the distribution level N2, the selectivity may be ensured in the same way by similar means which it is not necessary to describe further.

In the threshold processing circuit 14 is provided a delay logic or a timing element prohibiting the re-emission of a second neutralization signal within a predetermined time, for example, greater than at least a few periods, after the emission of the first neutralization signal S. Thus, in the case of welding of the contacts or a cut off fault of the downstream current limiting circuit breaker D1, the upstream current limiting circuit breakers D2—and possibly D3 if D1 has not been cut off—only remain neutralized for at most a current half wave. Thus, on the following half wave, the selectivity is no longer ensured for the thyristors no longer conduct and the two upstream circuit breakers are then actuated and must cut off together if the threshold $I_{A2}$ has been reached. It will be noted that thus safety is privileged after the given time with respect to the selectivity.

The device has been described with a care for simplicity for a single phase distribution network, but it applies of course also to the protection of any multi-phase distribution network. It is used advantageously in the case of remote controlled circuit breakers.

Thyristors TH1, TH2 and the associated low current circuits 15, 16 and possibly 14 may be either integrated in the corresponding current limiting circuit breaker box or be housed in an additive apparatus 19 juxtaposed with said box and interconnectable with the power terminals thereof.

I claim:

1. A device for protecting an AC distribution network against short circuit currents, the network comprising at least one upstream current limiting circuit breaker and at least one downstream current limiting circuit breaker, these current limiting circuit breakers being placed in series in an upstream branch and respectively in at least one dependent downstream branch of the network and each including a main power circuit with separable contacts, a magnetic tripping means and a current limiter capable of cutting off the corresponding branch when the current reaches respectively a tripping threshold ($I_D$) and a limitation threshold ($I_R$), characterized by the fact that:

the downstream branch having the downstream current limiting circuit breaker (D1) is provided with a current sensor (13) connected to a threshold processing circuit (14) which generates a neutralization signal (S) for opening the contacts for the upstream current limiting circuit breaker (D2) when the current in the downstream branch exceeds a given neutralization threshold ($I_{A1}$) less than the tripping threshold ($I_D$) and/or than the limitation threshold ($I_R$) of the upstream current limiting circuit breaker ($I_{D2}$), a pair of head to tail thyristors (TH1, TH2) is disposed in parallel with the main power circuit of the upstream current limiting circuit breaker (D2), while a circuit (16) for controlling the gates of said thyristors is adapted and controlled by the neutralization signal (S) coming from the downstream current limiting circuit breaker (D1) for enabling one at least of the thyristors and inhibiting the main power circuit of the upstream current limiting circuit breaker (D2) for a time at most equal to a half wave.

2. Protection device according to claim 1, characterized by the fact that the threshold processing circuit (14) includes a delay logic prohibiting, after emission of a first neutralization signal (S), the re-emission of another neutralization signal within a predetermined time.

3. Protection device according to claim 1 characterized by the fact that the circuit (16) for controlling the gates of the thyristors generates a firing signal of the order of a few milliseconds.

4. Current limiting circuit breaker for a protection device according to claim 1, including:
a main power circuit with separable contacts, a magnetic tripping means capable of opening said contacts when the current reaches a tripping threshold ($I_D$) and a current limiter capable of cutting off the corresponding branch when the current reaches a limitation threshold ($I_R$),
characterized by the fact that it includes:
a current sensor (13) connected to a current threshold processing circuit (14) which generates a signal (S) for neutralizing opening of the contacts for an upstream current limiting circuit breaker,
a pair of head to tail thyristors (TH1, TH2) disposed in parallel with the main power circuit, as well as a circuit (16) for controlling the gates of the thyristors adapted and controlled by the neutralization signal (S) coming from a dependent downstream current limiting circuit breaker so as to enable one at least of the thyristors and inhibit said main power circuit for a time at most equal to a half wave.

5. Current limiting circuit breaker according to claim 4, characterized by the fact that it includes a logic element ensuring the logic OR combination of the neutralization signals from several downstream current limiting circuit breakers dependent on the same upstream current limiting circuit breaker.

6. Protection device according to claim 2 characterized by the fact that the circuit (16) for controlling the gates of the thyristors generates a firing signal of the order of a few milliseconds.

* * * * *